Nov. 17, 1970  F. C. SCHWARZ  3,541,428
UNSATURATING SATURABLE CORE TRANSFORMER
Filed Nov. 4, 1968  2 Sheets-Sheet 1

FRANCISC C. SCHWARZ
INVENTOR.

BY
Herbert E. Farmer
ATTORNEYS.

Nov. 17, 1970 F. C. SCHWARZ 3,541,428
UNSATURATING SATURABLE CORE TRANSFORMER
Filed Nov. 4, 1968 2 Sheets-Sheet 2

FRANCISC C. SCHWARZ
INVENTOR.

BY
Herbert E. Farmer
ATTORNEYS.

United States Patent Office 3,541,428
Patented Nov. 17, 1970

3,541,428
UNSATURATING SATURABLE CORE
TRANSFORMER
Francisc C. Schwarz, Weston, Mass., assignor to the United
States of America as represented by the Administrator
of the National Aeronautics and Space Administration
Filed Nov. 4, 1968, Ser. No. 773,029
Int. Cl. H02p 13/12; H02m 3/32
U.S. Cl. 323—56            9 Claims

ABSTRACT OF THE DISCLOSURE

An unsaturating magnetic core is provided for use in transformers in electrical power processing equipment. The unsaturing core comprises two separate cores that operate in parallel. The function of the composite core transformer is described as part of a common parallel inverter within a D.C. to D.C. conversion system. The composite core is designed such that impending saturation of the core causes a warning signal to be generated which is then used to terminate current conduction in the primary circuit.

ORIGIN OF THE INVENTION

The invention described herein was made by an employee of the U.S. Government and may be manufactured and used by or for the Government of the United States of America for governmental purposes without the payment of any royalties thereon or therefor.

BACKGROUND OF THE INVENTION

This invention relates to magnetic cores, and more particularly, to an unsaturating, saturable magnetic core transformer.

Magnetic cores are used in transformers and in inductors which are common elements of electrical power processing circuits particularly in the self-oscillating type of power circuits such as inverters.

The parallel inverter is the most commonly used network for transforming direct currents to alternating currents. Basically, the inverter comprises a transformer whose core is magnetized in an alternating mode by a current from a D.C. source which is directed by a pair of switches to flow first through one-half and then flow through the other half, in recurrent succession, of the center-tapped primary winding of the transformer. The cyclically time varying magnetic flux which is thus generated in the transformer core induces potentials in the secondary winding which in turn cause an alternating current to flow in the load connected to this winding.

However, prior-art transformers are one of the principal causes of inverter circuit failure because of the overheating and therefore gradual destruction of the switching power transistors due to transformer saturation currents. This overheating occurs because the magnetizing current associated with saturable, uncut core transformers degenerates into harmful "spikes" at the end of each switching cycle of operation. These "spikes" occur because of the finite time interval between initiation of the switch-opening process and the completion of transfer of current flow through a diode in the secondary transformer circuit. During this finite time an appreciable amount of the energy is being dissipated in the switches. This power loss component assumes a sizable proportion for leakage inductances on the order of tens of microhenries and for load currents on the order of amperes and for frequencies on the order of kHz.

FIG. 3 illustrates the typical magnetizing current in a saturable core parallel inverter transformer. As shown in FIG. 3, a small but finite length of time $T_d$ is available for the transmission of the warning signal and the implementation of the switch-opening process. The magnetizing current $i_m$ does continue to rise during the time interval $T_d$ because of the vanishing capability of the transformer to produce a counter EMF due to the increasing saturation of its magnetic core. Therefore, it is necessary to obtain information of impending saturation of the transformer core sufficiently in advance to provide a "reserve" of counter EMF capacity of the transformer which would then be available to prevent the occurrence of a current "spike" during the turn-off process of the switch.

Accordingly, one of the primary considerations in parallel inverter design is to provide, as complete as possible, the prevention of saturation of the magnetic core material. The history and the present state-of-the-art of inverter design has been and still is characterized by temptations to use the highly efficient saturable transformer core materials (with their excellent properties of low core losses and negligible storage of magnetic energies) and take the risk of the catastrophic destruction of the semiconductor switching elements due to the previously-described saturation current spikes. However, the prior-art use of transformer cores with discrete or distributed airgaps eventually destroys the switching element because of the cyclic discharge of undesirable stored magnetic energies. Also, prior art attempts to reduce energy dissipation (heat) in the switching elements have included: (1) elimination of the commonly used air gap by use of continuous (uncut) power transformer cores; (2) limitation of leakage inductance by careful design of the power transformer; and (3) improvement of semiconductor switch characteristics, especially their turn-off time. However, use of an uncut power transformer core introduces the problem of "short circuit" currents being generated during transient phases of magnetic core saturation. Also, limitation of leakage inductance by careful design is not practical because the generation of magnetic flux lines that would enclose only the primary or secondary windings exclusively cannot be completely avoided. And a pursuit of transistor (or silicon-controlled rectifier or other switching devices) turn-off time below the order of microseconds may not necessarily lead to the desired goals because the turn-off time of the transistors (or silicon-controlled rectifier or other switching devices) may be determined by the time constants of the actual circuit rather than their turn-off time within a purely resistive network.

Accordingly, an object of this invention is to provide an unsaturating composite magnetic core transformer with means of detecting, warning and suppressing of impending saturation, of its uncut saturable magnetic core before any actual saturation of the composite core occurs.

Another object of this invention is to provide an unsaturating composite magnetic core which enables a wide degree of flexibility in the design of transformers for a wide range of operating frequencies and load currents.

A further object of this invention is to provide an unsaturating composite magnetic core for transformers which enables the utilization of highly efficient uncut magnetic square-loop materials operating entirely within the non-saturated region.

And a further object of this invention is to provide an unsaturating composite magnetic core transformer which is simple, inexpensive, lightweight and reliable.

SUMMARY OF THE INVENTION

The invention provides an unsaturating magnetic core for use in transformers and inductors by stacking two, uncut magnetic cores of similar shape and material such that one single, composite core is formed. Each core is enclosed, individually, by a premagnetizing winding and a sensing winding. The two premagnetizing windings enclosing each of the two cores are connected in series opposition to insure identical current flow. The two sensing windings are also connected in series opposition. Both cores are enclosed by common, center-tapped, primary and secondary windings. The composite core transformer is shown as part of a common parallel inverter for D.C. to D.C. conversion. If one of the individual cores does saturate during inverter operation, the circuitry operates such that all of the potential of the unsaturated half of the transformer will appear across a ballast resistor connected in series with the sensing windings, and would thus generate a voltage pulse. This pulse is then used to turn-off the switch that is causing impression of the voltage pulse on the primary winding of the transformer and thereby suppressing and terminating possible saturation of the composite core.

BRIEF DESCRIPTION OF THE DRAWINGS

Other objects, features and advantages of the invention will be further appreciated and understood by referring now to the following detailed specification wherein reference is made to the accompanying drawings, in which like reference characters refer to like parts, and in which.

DESCRIPTION OF THE PREFERRED EMBODIMENT

Figure 1:
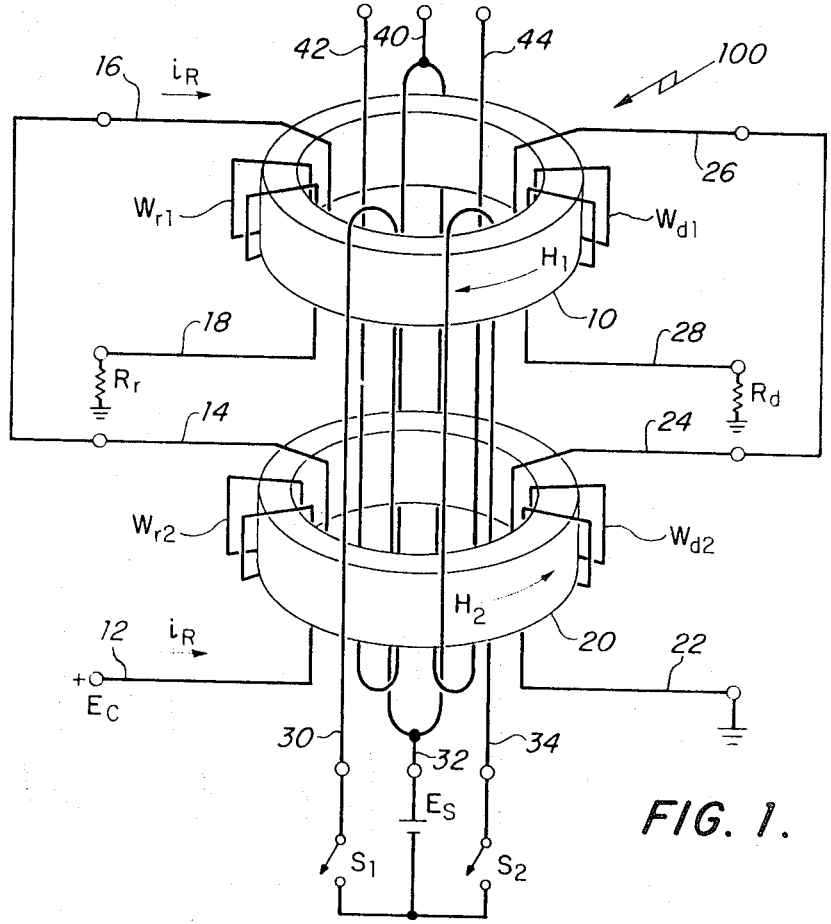
FIG. 1 is a partially isometric, and a partially schematic, diagram of the manner in which the dual magnetic cores are wired to form the composite core.

As shown in FIG. 1, the composite core, 100, is comprised of a pair of toroidal, saturable cores, 10 and 20. Each of the cores, 10 and 20, may be composed of any suitable magnetic material, for example oriented 50% nickel iron. The two magnetic cores, 10 and 20, are uncut cores of similar shape and material and are stacked on top of each other to form the composite transformer core to be called core 100.

Each of the cores, 10 and 20, are wound with a pair of control windings, each pair comprised of a premagnetizing winding and a sensing winding. This is shown in FIG. 1, where core 10 is wound with the windings $W_{r1}$ and $W_{d1}$, and core 20 is wound with windings $W_{r2}$ and $W_{d2}$, where subscript $r$ and $d$ denotes a premagnetizing winding and a sensing winding, respectively. Further, the magnetic cores, 10 and 20, are coupled together by two windings common to both cores and comprised of: (1) a center-tapped primary winding having input leads 30, 32 and 34 which connect to the pair of switches, $S_1$ and $S_2$, and the battery $E_S$; and (2) a center-tapped secondary winding having output leads 42, 40 and 44. These common windings are connected such that the individual cores operate in parallel, yet together they form one single core within one and the same transformer.

The connections of the windings in FIG. 1 are such that current flow from a battery $E_c$ enters winding $W_{r2}$ of core 20 via a lead 12 and exits via a lead 14 where it then enters winding $W_{r1}$ of core 10 via a lead 16 and exits via a lead 18 and proceeds to ground via a resistor $R_r$. The only purpose of the premagnetizing windings, $W_{r1}$ and $W_{r2}$, is to establish the magnetic bias fields. The windings, $W_{r1}$ and $W_{r2}$, are connected in series to insure that the same current flows through both windings. The battery $E_c$ insures that an invarying current flows through both coils, 10 and 20.

The sensing windings, $W_{d1}$ and $W_{d2}$, are connected in series-opposition such that the current flowing, due to any EMF developed, enters winding $W_{d2}$ of core 20 via a lead 22 and exits via a lead 24 where it then enters winding $W_{d1}$ of core 10 via a lead 26 and exits via a lead 28 and proceeds to ground via a resistor $R_d$.

Current flow through windings $W_{r1}$ and $W_{r2}$ causes a premagnetization such that the BH loop of one of the cores will "stick" near the opposite saturation level of the other core, this being possible because of the opposite sense in which these windings are interconnected.

Figure 2:
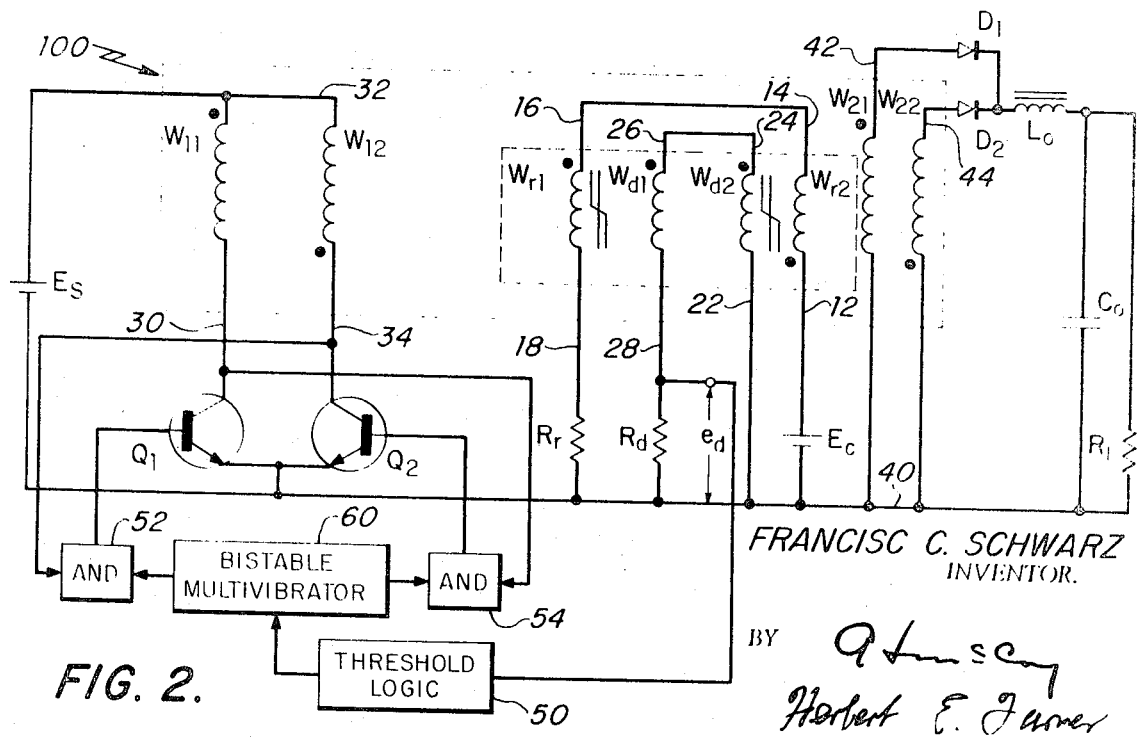
FIG. 2 is a schematic diagram of the invention comprising dual cores that operate in parallel and is shown as part of a common, parallel inverter within a D.C. to D.C. conversion system.

Referring now to FIG. 2, the invention is shown, in schematic representation, as it would be connected into a common parallel inverter circuit, where the proper polarity of the control windings is indicated by the polarity dots. When this circuit is in operation, no signal $e_d$, will appear across the ballast resistor $R_d$ under the conditions that neither core 10 nor core 20 saturates at any time and that the following products hold true:

$$A_1 N_{d1} = A_2 N_{d2} \text{ and } A_1 N_{r1} = A_2 N_{r2}$$

Here, $A_1$ and $A_2$ are the net cross-sectional areas of cores 10 and 20, respectively; while $N_{d1}$ and $N_{d2}$ are the number of turns in windings $W_{d1}$ and $W_{d2}$, respectively; and $N_{r1}$ and $N_{r2}$ are the number of turns in windings $W_{r1}$ and $W_{r2}$ respectively.

The current $i_R$, from a D.C. source $E_c$ flows through the series combination of windings $W_{r1}$ and $W_{r2}$ and the current-limiting resistor $R_r$, and is determined solely by the potential of the source $E_c$ and the ohmic resistance in its path.

The control current $i_R$ establishes, in the individual transformer core-halves 10 and 20, equal, but opposite, biasing magnetic fields having intensities $H_{b1}$ and $H_{b2}$, respectively. The magnetizing field intensity $H_i$ in each transformer core-half is expressed as an algebraic sum composed of one of the biasing magnetic field intensity components, $H_{b1}$ and $H_{b2}$, and the magnetic field intensity component $H_{N1}$—a component due to the magnetizing current $i_m$ in the $N_1$ turns in any of the primary windings. The net flux change of the composite transformer core 100 is zero provided that the polarity of windings $W_{r1}$ and $W_{r2}$ oppose each other and that neither of the two transformer core-halves is saturated.

Figure 4A:
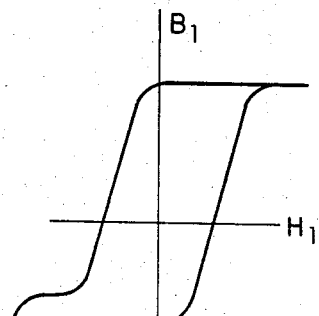
FIGS. 4a, 4b and 4c are explanatory graphs illustrating the individual BH loops of the dual core halves and the effect of superimposing both loops incorporating the effects of the interacting magnetic field intensities in the individual cores.
Figure 4B:
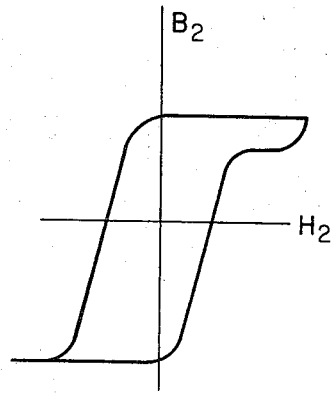
Figure 5:
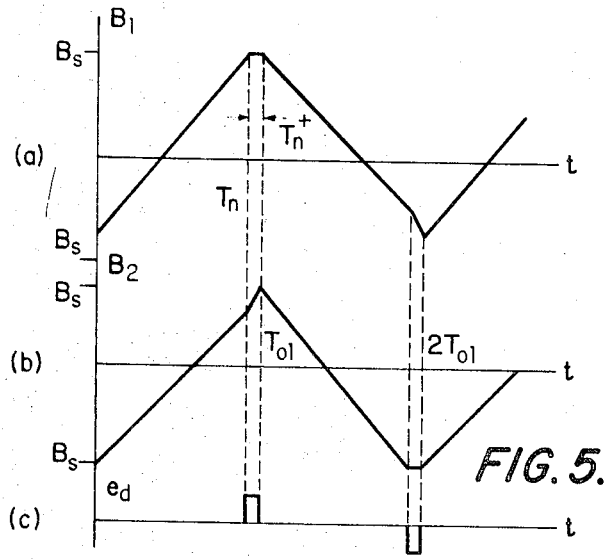
FIGS. 5a, 5b and 5c illustrate in graphic form the flux densities, $B_1$ and $B_2$, in the two cores and the difference voltage, $e_d$, generated by the sensing windings.

The individual BH loops, $B_1$ and $B_2$, of the two core-halves, 10 and 20, are illustrated in FIGS. 4a and 4b where it is shown that: (1) the loops are essentially similar as long as both core-halves are not saturated; and (2) the loops are approximately double in width when one core-half saturates and the other core-half continues to absorb volt-seconds, but now at twice the previous rate. The waveforms of the flux densities, $B_1$ and $B_2$, as a function of time are shown in FIGS. 5a and 5b.

Figure 4C:
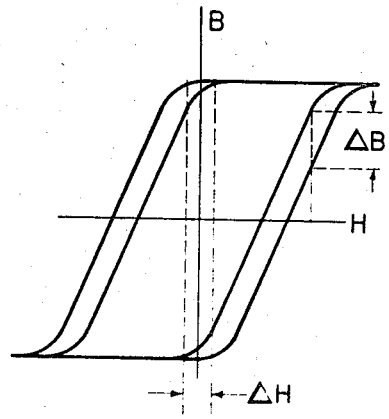

The difference in magnetic field intensity, $\Delta H$, between the two core-halves is illustrated in FIG. 4c, where it is assumed that no interaction exists between the two core-halves. The significant effect due to the opposing magnetic field intensities, $H_{b1}$ and $H_{b2}$, in the individual core-halves is that saturation occurs in one core before it occurs in the other after both cores absorb the volt-seconds impressed on their common primary windings via the leads 30, 32, and 34.

The rate of change of magnetic flux density in the individual core-halves due to the impression of $e_1$ volts on the primary inverter windings, $W_{11}$ or $W_{12}$, is:

$$\frac{dB}{dt} = e_1/2A_iN$$

when $0 < t < T_n$, and $$\frac{dB}{dt} = e_1/A_iN$$

when $T_n < t < T_K$.

Figure 6:
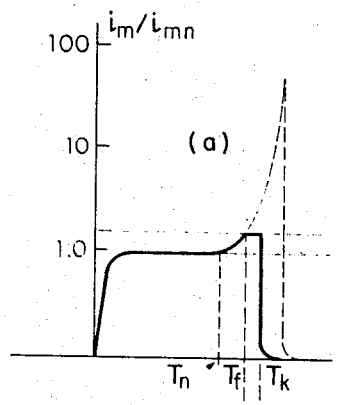
FIGS. 6a, 6b and 6c are explanatory graphs illustrating the relation between (a) the magnetizing current in one core half during one-half cycle of operation normalized with respect to the magnetizing current in its non-saturated state, (b) the corresponding BH-loop, the magnetization being normalized to its coercive force $H_R$ in the non-saturated state, and (c) the magnetic flux density in the same core half.
Figure 6:
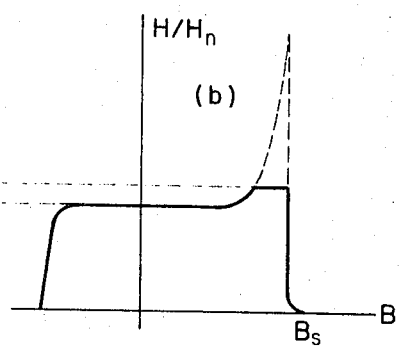
Figure 3:
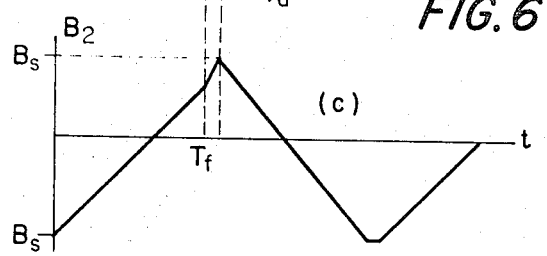
FIG. 3 is an explanatory graph illustrating a typical magnetizing current waveform found in parallel inverters with a saturable core transformer; it illustrates in detail the occurrence of a saturation current "spike" during the small but finite time interval, $T_d$, required to turn-off one switch in each pair of the switches illustrated in FIGS. 1 and 2.
Figure 3:
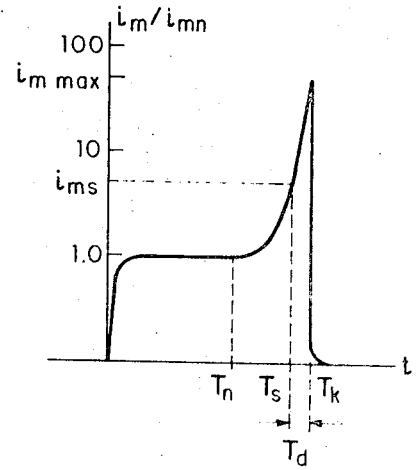

As illustrated in FIGS. 5b and 6c, the magnetic flux density, $B_2$, in core-half 20, continues to change after core-half 10 has approached its saturation $B_S$ (the maximum flux density level) at time $T_f$ (refer also to FIGS. 5a and 6a). FIGS. 6a, 6b and 6c, illustrate the relationship between magnetizing current, BH-loop and the magnetic flux density in core 20 under the above indicated conditions of operation.

During the time interval $T_f < t < T_k$, all of the flux change, corresponding to the application of the potential $e_1$ to the transformer windings, will take place in core 20 at twice the previous rate. The converse takes place during the opposite cycle of operation of the inverter.

A signal $e_d$ appears across the ballast resistor $R_d$ whenever one of the core halves, 10 or 20, saturates. This results because the EMF developed in winding $W_{d1}$ or $W_{d2}$ (whichever winding encloses the unsaturated core) now has no opposition from its companion winding around the saturated core. The individual pulse lengths, $T_d$, of the voltage $e_d$ generated in winding $W_{d1}$ or $W_{d2}$ and due to application of potential $e_1$ to the transformer windings, is illustrated in FIG. 5c. The magnitude of voltage $e_d$ is related to $e_1$ by the relation $e_d = e_1 W_{d1}/W_{11}$. As shown in FIG. 2, the signal $e_d$ acts on the inverter switch-control mechanism to initiate opening of the current-carrying primary circuit, thus terminating this cycle of operation after a delay time $T_d$ and thereby preventing any actual saturation of the composite core.

A deeper appreciation and a fuller understanding of the invention may be comprehended by referring once again to FIG. 2 wherein the transformer composite core 100 is shown as part of a common, parallel inverter within a D.C. to D.C. conversion system. The composite core 100 is comprised of cores 10 and 20 which have premagnetizing windings $W_{r1}$ and $W_{r2}$ and sensing windings $W_{d1}$ and $W_{d2}$ connected via leads 12, 14, 16, 18 and 22, 24, 26 and 28, respectively, and connected in a manner heretofore described in FIG. 1. Both of the cores, 10 and 20, and their respective control windings, are enclosed by common, center-tapped, primary and secondary windings, $W_{11}$ and $W_{21}$, respectively, such that the individual cores 10 and 20 operate in parallel within one and the same transformer. A threshold logic circuit 50 (of any convenient type such as a Schmitt trigger or high gain differential amplifier) and a triggered electronic sequencing and driving circuit 60 (of any conventional type such as a Bistable Multivibrator) are connected to the ballast resistor $R_d$ and to the base terminals of the switching power transistors $Q_1$ and $Q_2$. The switches $Q_1$ and $Q_2$ are driven to bring about inverter operation, meaning to close the primary circuit halves of transformer 100 in an alternating fashion as described previously. The inverter operates in a conventional manner. A signal $e_d$ would not appear across ballast resistor $R_d$ at any time during inverter operation if there were no premagnetizing current flow in windings $W_{r1}$ and $W_{r2}$. When current does flow in the premagnetizing windings $W_{r1}$ and $W_{r2}$, the signal $e_d$ still will not appear across the resistor $R_d$ as long as neither of the cores 10 or 20 is saturated, because the control windings $W_{d1}$ and $W_{d2}$ have an equal number of turns and have opposite polarity. However, when one of the two cores 10 or 20 does saturate, then all of the potential of the unsaturated transformer half will appear across the resistor $R_d$ as a potential $e_d$. This voltage pulse $e_d$ can then be used to turn-off the switch that is causing impression of the voltage pulse on the primary winding via the threshold logic circuit 50 and the sequencing circuit 60. A pair of AND gates 52 and 54 connect the circuits 50 and 60 and serve to prevent initiation of inverter cycles of opposite polarity until the companion switch has actually opened.

As shown in FIG. 2, a pair of diodes $D_1$ and $D_2$ are connected to rectify the A.C. output of the transformer. A standard, low pass filter with an input-inductor $L_0$ and a capacitor $C_0$, is connected to reduce the ripple before the voltage wavefront induced in the secondary windings is applied to a load $R_L$.

By way of example, under the actual operating conditions, the power transistors may have turn-off times on the order of 3-4 microseconds. The inverter may operate as part of the D.C. to D.C. converter in the voltage scaling squarewave mode at an inverter frequency of 1–10 kHz. from a 24–34 v. D.C. source at a power level of about 100 watts.

Accordingly, there has been shown and described a composite transformer saturable core construction which will not saturate at any time under any conditions for any length of time. Thereby the present invention virtually eliminates the main apparent cause of power transistor failure in inverter circuits. The invention enables a better utilization of existing electronic switching components since it reduces the need to derate these components to a small fraction of ⅓ or less of their current-carrying capacity. Also, incorporation of the present composite transformer core in inverters enables existing power transistors to process twice or more load current than is presently possible.

Another feature of the invention is that the total magnetic composite transformer core volume is almost identical with that of prior art single core transformers. The control windings utilized herein are of negligible physical size. There is no other penalty in size or weight.

Still another feature is that the invention permits a wide flexibility of transformer designs because the invention can be fabricated with standard transformer fabrication processes using standard magnetic cores and magnetic wires.

And a further feature of the invention is that the invention can be implemented with use of highly efficient magnetic square loop materials.

While there have been shown and described and pointed out the fundamental novel features as applied to the preferred embodiment, it is to be understood that many modifications and variations of the present invention may be made by those skilled in the art without departing from the spirit and the scope of the invention. For example, a "reserve" capacity can be built into the composite core such that even an expected D.C. unbalance will not saturate the transformer core. Also, the size and temperature coefficient of the ballast resistor $R_r$ can be chosen to compensate for the temperature sensitivity of magnetic core materials. And although the core loop in the preferred embodiment is of a circular configuration, other closed geometries, for example, a rectangular configuration, may be used. Also, different cross sections or more than two cores may be used. It is the intention, therefore, that all matter described herein is illustrative and is to be limited only as indicated by the scope of the appended claims.

What is claimed is:

1. An unsaturating composite magnetic core transformer comprising:
   a first and a second core of saturable magnetic material connected electro-magnetically to operate in parallel,
   each of said cores having a premagnetizing winding and a sensing winding,
   means for biasing said premagnetizing windings, said sensing windings and said premagnetizing windings being connected in polarity opposition about their respective cores while still forming a series circuit, common primary and secondary windings enclosing both of said first and second cores and coacting to produce a secondary output current, first and second switching means, means for energizing said common primary windings controlled by said first and second switching means, and threshold means responsive to the output of said sensing windings for generating an output signal warning of any impending magnetic saturation of said composite core before actual saturation of said composite core.

2. The apparatus as described in claim 1 which further includes control means responsive to the output of said threshold means for prevention of actual transformer composite core saturation.

3. The apparatus as described in claim 2 wherein said control means responsive to the output of said threshold means includes means for interrupting the current in the primary winding which is causing the impending saturation during the turn-off time of the corresponding first or second switching means.

4. The apparatus as described in claim 1 wherein each of said first and second saturable cores has a square loop hysteresis characteristic.

5. The apparatus as described in claim 1 wherein said threshold means comprises means for biasing said individual core premagnetizing windings and ballast resistor means connected to the output of said sensing windings.

6. The apparatus as described in claim 5 which further includes threshold logic means connected to the output of said ballast resistor means.

7. The apparatus as described in claim 1 wherein the product of the number of the turns in the premagnetizing windings of said first core times the net cross-sectional area of said first core is equal to the number of turns in the premagnetizing windings of said second core times the net cross-sectional area of said second core and the product of the number of turns in the sensing windings of said first core times the net cross-sectional area of said first core is equal to the number of turns in the sensing windings of said second core times the net cross-sectional area of said second area.

8. The apparatus as described in claim 1 wherein each of said first and second cores is composed of materials having similar magnetic properties.

9. The apparatus as described in claim 1 wherein each of said first and second cores is composed of materials having different magnetic properties.

References Cited

UNITED STATES PATENTS

| | | | |
|---|---|---|---|
| 2,873,371 | 2/1959 | Van Allen. | |
| 2,975,298 | 3/1961 | Fawcett et al. | 323—56 X |
| 3,374,398 | 3/1968 | Horn et al. | 323—56 X |

J D MILLER, Primary Examiner

GERALD GOLDBERG, Assistant Examiner

U.S. Cl. X.R.

307—88; 321—25; 323—89; 331—113